(12) United States Patent
Mamish

(10) Patent No.: US 7,361,384 B2
(45) Date of Patent: Apr. 22, 2008

(54) CORROSION PROTECTION SYSTEM FOR TRANSPORT PIPE

(75) Inventor: Abboud L. Mamish, Marlborough, MA (US)

(73) Assignee: Covalence Specialty Materials Corp., Franklin, MA (US)

( * ) Notice: Subject to any disclaimer, the term of this patent is extended or adjusted under 35 U.S.C. 154(b) by 247 days.

(21) Appl. No.: 11/035,521

(22) Filed: Jan. 14, 2005

(65) Prior Publication Data

US 2006/0159942 A1 Jul. 20, 2006

(51) Int. Cl.
*B05D 1/02* (2006.01)
(52) U.S. Cl. .................................... 427/422; 427/421.1
(58) Field of Classification Search ............... 156/187, 156/215; 427/421, 422
See application file for complete search history.

(56) References Cited

U.S. PATENT DOCUMENTS

| | | | | |
|---|---|---|---|---|
| 3,415,287 A | * | 12/1968 | Lanza et al. ............... | 138/141 |
| 3,616,006 A | * | 10/1971 | Landgraf et al. ........... | 156/188 |
| 3,874,418 A | * | 4/1975 | Hielema .................... | 138/144 |
| 3,877,490 A | * | 4/1975 | Tsubouchi ................. | 138/141 |
| 4,156,398 A | * | 5/1979 | McDaniel .................. | 118/704 |
| 4,211,595 A | | 7/1980 | Samour | |
| 4,268,334 A | | 5/1981 | Harris et al. | |
| 4,472,231 A | | 9/1984 | Jenkins | |
| 4,721,832 A | * | 1/1988 | Toy ........................... | 174/87 |
| 4,946,529 A | | 8/1990 | Huddleston | |
| 4,963,698 A | * | 10/1990 | Chang et al. .............. | 174/77 R |
| 5,108,809 A | | 4/1992 | Patiel et al. | |
| 5,300,356 A | | 4/1994 | Dempster et al. | |
| 5,405,665 A | * | 4/1995 | Shukushima et al. ...... | 428/34.9 |
| 5,462,780 A | | 10/1995 | Richards | |
| 5,662,974 A | * | 9/1997 | Andrenacci et al. ....... | 428/36.9 |
| 5,700,530 A | * | 12/1997 | Van Beersel ............... | 428/35.9 |
| 5,775,378 A | * | 7/1998 | Auvil et al. ................ | 138/143 |
| 6,065,781 A | * | 5/2000 | Titus ......................... | 285/55 |
| 6,306,954 B1 | * | 10/2001 | Nishikawa et al. ........ | 524/514 |
| 6,758,923 B2 | * | 7/2004 | Butterworth et al. ...... | 156/64 |
| 2002/0002244 A1 | * | 1/2002 | Hoelter et al. ............. | 525/107 |
| 2003/0201058 A1 | * | 10/2003 | Banas et al. ............... | 156/143 |
| 2005/0008871 A1 | * | 1/2005 | Sikora ....................... | 428/421 |
| 2005/0046177 A1 | * | 3/2005 | Chmiel et al. ............. | 285/55 |
| 2006/0108016 A1 | * | 5/2006 | Funatsu et al. ............ | 138/141 |
| 2006/0159942 A1 | * | 7/2006 | Mamish ..................... | 428/515 |

FOREIGN PATENT DOCUMENTS

| | | | |
|---|---|---|---|
| EP | 0 309 597 | * | 9/1987 |
| EP | 0 495 560 | * | 7/1992 |
| JP | 01-184119 | * | 7/1989 |
| JP | 2006-194368 | * | 7/2006 |
| WO | WO 91/13756 | * | 9/1991 |

OTHER PUBLICATIONS

Corrosion Control Company website "www.farwestcorrosion.com" (2006).*
Kalene® Liquid Butyl Rubber, Material from Elementis Specailties (2000).*

* cited by examiner

*Primary Examiner*—Sheeba Ahmed
(74) *Attorney, Agent, or Firm*—Maldjian & Fallon LLC; John Maldjian; Jon Fallon

(57) ABSTRACT

An apparatus and method for coating pipelines with a hot melt adhesive coating and a tape. The coating may comprise a copolymer of an alkyl substituted hydrocarbon polymer in combination with a diene polymer and the tape to overly the coating may comprise a polymeric backing. Furthermore, the tape may also include a pressure sensitive adhesive.

19 Claims, No Drawings

CORROSION PROTECTION SYSTEM FOR TRANSPORT PIPE

FIELD OF THE INVENTION

The present invention relates to an apparatus and method to provide exterior protection to conduits such as metal pipeline. More particularly, the present invention relates to a coated conduit and method for preparing a coated conduit with polymeric resin.

BACKGROUND OF THE INVENTION

Metallic pipes and pipeline may be used to transport a variety of materials such as oil, gas, water and coal slurry. These pipelines are exposed to a wide variety of environmental stresses as, for example, they may be placed underground or exposed to a variety of temperatures. Due to the harsh environments the pipes and pipelines are exposed to they often corrode, which may lead to leakage of the pipe contents into the surrounding environment and, in time, lead to complete mechanical failure of the pipes or pipelines.

Providing corrosion and mechanical protection to a metallic pipeline is reported in the art. Over the years a number of methods and compositions have been utilized to improve upon this goal. The present invention is therefore directed to expanding upon the category of materials and methods that one may utilize to provide a coating or resistance to selected environment, on, e.g., a conduit pipeline.

SUMMARY OF THE INVENTION

An aspect of the present invention relates to a protection system for pipelines comprising a coating comprising a copolymer of an alkyl substituted hydrocarbon polymer in combination with a diene polymer; and a tape to overly the coating, comprising a polymeric backing.

Another aspect of the present invention relates to a protection system for pipelines comprising a coating comprising a hot melt adhesive; and a tape to overly the coating, comprising a polymeric backing, wherein the viscosity of the hot melt adhesive is at or below about 40,000 cps at 425° F.

Another aspect of the present invention relates to a method of applying corrosion and mechanical protection to a pipeline comprising providing a substrate having a surface; applying a hot melt adhesive onto the substrate surface, the hot melt adhesive having a viscosity of equal to or less than about 40,000 cps. at 425° F.; and applying a tape to the hot melt adhesive, the tape having a polymeric backing.

DETAILED DESCRIPTION OF THE PREFERRED EMBODIMENTS

The present invention relates to an apparatus and method for providing mechanical and corrosion conduit protection. More particularly, the present invention relates to an apparatus and method for coating pipelines with a hot melt adhesive and a tape.

In one embodiment of the present invention, a substrate in the form of a metallic pipe maybe provided upon which a resin coating may be applied. Preferably, the resin coating may be a hot melt adhesive. Preferably, the metallic pipe may be preconditioned by blasting or any such method that would provide a clean finish such that the finish is more susceptible to bonding with the resin to be applied herein. Then a tape may be applied onto the coated pipe. The tape may have a polyolefin backing. In another embodiment, the tape may carry a layer of pressure sensitive adhesive on the polyolefin backing.

In context, the term "hot melt adhesive" herein is reference to any chemical compound that will soften or flow upon application of heat, and assume the general contour of a given substrate surface. Furthermore, the term "pressure sensitive adhesive" is reference to a chemical compound which, upon application of pressure will initially adhere to a selected substrate surface. Therefore, it can be appreciated that certain chemical compounds, depending upon their characteristics, may act herein as both a hot melt adhesive and a pressure sensitive adhesive.

In another embodiment, the hot melt adhesive may preferably be a copolymer of an alkyl substituted hydrocarbon polymer in combination with a diene polymer. More specifically, the alkyl substituted hydrocarbon polymer is preferably a hydrocarbon polymer manufactured from isobutylene monomer, to provide polyisobutylene, which may be copolymerized with isoprene monomer. Accordingly, the preferred hot melt adhesive may be a copolymer of polyisobutylene and polyisoprene, wherein the polyisobutylene may be present at levels of about 90% and greater, and the polyisoprene may be present at a level of about 10% and lower. In addition, all incremental values there between are contemplated.

One advantageous characteristic of the copolymers noted above is that they serve as a coating which may also provide a substantially water and gas impermeable layer along with flexibility and weathering resistance. That is, the copolymers may provide resistance to ozone and other potential sources of free radical attack given the preferably low concentration of residual unsaturation of the diene component in the over all copolymer composition. Furthermore, as noted herein, it has been recognized that such copolymers may provide a useful melt viscosity window with respect to temperature, and a viscosity-temperature profile operating range, that allows such copolymers to be heated, caused to flow, and applied by spraying to a selected substrate surface.

Accordingly, the adhesive herein may be one that may be caused to flow by the application of heat. Also more preferably, the adhesive as described herein above, may also be a relatively low viscosity adhesive having a viscosity at 250° F. of approximately between 15,000 and 30,000 cps. and all incremental values there between, i.e. 15,000 to 20,000 cps., 20,000-30,000 cps., 18,000-23,000 cps., etc. and a viscosity at 375° F. of approximately between 200 and 4000 cps. and all incremental values there between, i.e. 200 to 1,000 cps., 1,000 to 3,000 cps., 400 to 600 cps. etc. Most preferably, the adhesive may have a viscosity-temperature profile of approximately 20,000 cps. at 250° F. and a viscosity of approximately 500 cps. at 357° F. Furthermore, it is preferable that the adhesive may provide resistance to cathodic disbondment and exhibits peel strength of approximately between 20 to 40 lb/in at room temperature. Preferably, the adhesive may be obtained from Elementis Specialties of Belleville, N.J. and is sold under the trade name Kalene®.

In another embodiment of the present invention other co-polymer hot melt adhesives may be employed. Preferably, the co-polymer hot melt adhesives may therefore also include ethylene-vinyl acetate (EVA), ethylene-ethylene acrylate copolymers (EEA), ethylene-methyl acrylate (EMA), ethylene-acrylic acrylate (EAA) or combinations thereof.

In one embodiment, the adhesive may be heated between 300° F. to 450° F. and all incremental values there between including, 350° F. to 375° F., 375° F. to 450° F., 350° etc.

Preferably, the adhesive may be heated in a drum unloader. More preferably, the drum unloader may be available from Covert Machinery, Baltimore, Md. However, it should be appreciated that the adhesive may be heated using other known devices, such as heating the adhesive under pressure in a container, or using other known methods of reducing the viscosity of the adhesive. For example, the adhesive may be stored in a container and using a heated hydraulic platen the adhesive may be heated and/or pressurized in preparation for application.

In another embodiment of the present invention, and as alluded to above, the hot melt adhesive may be applied to the substrate by spraying the adhesive onto the substrate through an orifice or plurality of orifices. Preferably, the adhesive may be heated and sprayed through the orifice and onto the substrate by force using hot air. More preferably, the adhesive may be sprayed onto the substrate using a die having one or more holes per linear inch. Preferably, the die may have ten to 25 holes per linear inch and all incremental values there between such as 2 to 15 holes per inch, 11 to 17 holes per inch, 20 to 24 holes per inch, etc. Also preferably, each hole or opening may have a length and width which may be between 0.005 to 0.50 inches and all incremental values there between. Accordingly, the holes may be square or rectangular in shape. Furthermore, it should be appreciated that circular holes may also be used in this invention, wherein the holes have a diameter of 0.005 to 0.50 inches. More preferably, the die may have 17 holes per linear inch, wherein each hole is 0.012 inches by 0.024 inches. Preferably, the die may be obtained from Covert Machinery, Baltimore, Md. and is model number S-22.

It should be appreciated that the rotating pipe may be advanced in-front of the orifice in both linear and radial directions. However, depending on the application method used, i.e., if more than one spray gun is used or the adhesive is extruded over the pipe, it may be necessary to only advance the pipe in a linear direction.

Furthermore, the adhesive may be deposited onto the pipe between 1 to 50 mils thick and all incremental values there between. Accordingly, it can be appreciated that by use of a hot melt adhesive resin herein, and in the optional spray form, one or a plurality of multiple layers of resin may be conveniently applied to the substrate. These layers may be 3 to 5 mils, 1 to 10 mils, 3 to 10 mils, 20 to 40 mils, 20 to 50 mils, 25 to 30 mils, etc. It should be appreciated that higher build on thickness may be facilitated by multiple nozzles or guns.

In one embodiment of the invention, the resin coating is sprayed on the substrate with some desired amount of overlap. For example, using a 4 inch spray pattern, preferably, a one inch overlap may be present in the pattern. Furthermore, this process in conjunction with the sprayed adhesive underneath the overlap may maximize the adhesion in the overlap area.

In one embodiment, the tape may be a polyolefin tape. Preferably, the polyolefin may be a polyethylene but may also be a polypropylene. More preferably, the tape backing may be a blend of low and high density polyethylene. The high density polyethylene may be present at levels of about 10-90% by weight and the low density polyethylene may be present between 90-10% by weight. Furthermore the density of the high density polyethylene may be equal to or greater than about 0.94 g/cc and the density of the low density polyethylene may be less than or equal to about 0.92 g/cc.

Also preferably, the polyolefin backing may be between 15 to 40 mils thick. However, it should be appreciated that the polyolefin backing may be between 5 to 60 mils thick and all incremental values there between including 5-10 mils, 15-25 mils, 15-30 mils, 40-60 mils, etc.

In another embodiment, the tape may carry a pressure sensitive adhesive. Preferably, the pressure sensitive adhesive may have a viscosity greater than the viscosity of the hot melt adhesive. In one embodiment the pressure sensitive adhesive may have a Mooney viscosity between 5 and 20 and all incremental values therebetween including 10-15, 14-20 and 12-18. In another embodiment, the pressure sensitive adhesive may have a Mooney viscosity between 8-15.

In another embodiment, the pressure sensitive adhesive may have a softening point between 50-250° C. and incremental values therebetween, including 100-180° C., 150-250° C. a 100-200° C., as measured by ASTM Standard E-28, using the Ring and Ball Softening Point apparatus. In another embodiment the pressure sensitive adhesive included in or coating the tape may be a butyl rubber based adhesive. More preferably, the pressure sensitive adhesive may include additives such as oils, tackifiers, fillers and antioxidants. It should be understood that other pressure sensitive adhesives may be used, along with the coating disclosed herein.

In one embodiment of the present invention, the metallic pipe may be a steel pipe. However, it should be appreciated that other substrates or even coated substrates may be used in the present invention, including polyolefin, such as polyethylene and polypropylene, polyurethane and epoxy substrates and coatings.

The foregoing description is provided to illustrate and explain the present invention. However, the description hereinabove should not be considered to limit the scope of the invention set forth in the claims appended here to.

What is claimed is:

1. A method of applying corrosion and mechanical protection to a pipeline, the method comprising:
   providing a substrate having a surface, said substrate comprising at least a portion of said pipeline;
   applying a hot melt adhesive onto said substrate surface by heating said hot melt adhesive between 300° F. to 450° F. and spraying said hot melt adhesive through an orifice onto said substrate surface, said hot melt adhesive having a viscosity of equal to or less than about 40,000 cps. at 425° F.; and
   applying a tape to said hot melt adhesive, said tape having a polymeric backing.

2. The method of claim 1 wherein said step of spraying comprises supplying a spraying device including a die wherein said die comprises one or a plurality of openings having a length of about 0.005 to 0.50 inches and a width of about 0.005 to 0.50 inches.

3. The method of claim 1 further comprising preconditioning said substrate wherein preconditioning said substrate surface includes the step of blasting said substrate.

4. The method of claim 1 wherein said substrate comprises a steel pipe.

5. The method of claim 1 wherein said substrate further comprises an outer surface, and a layer disposed on said outer surface wherein said layer is selected from the group consisting of polyethylene, polypropylene, polyurethane and epoxy.

6. The method of claim 1 wherein said polymeric backing comprises a polyethylene selected from the group consisting of low density polyethylene, high density polyethylene and blends thereof.

7. The method of claim 1 wherein said tape includes a pressure sensitive adhesive, wherein said pressure sensitive adhesive contacts said hot melt adhesive.

8. The method of claim 7 wherein said pressure sensitive adhesive comprises a butyl rubber.

9. A method of applying corrosion and mechanical protection to a pipeline, the method comprising:
providing a substrate having a surface, said substrate comprising at least a portion of said pipeline;
applying a hot melt adhesive comprising an alkyl substituted hydrocarbon polymer in combination with a diene polymer onto said substrate surface by heating said hot melt adhesive between 300° F. to 450° F. and spraying said hot melt adhesive through an orifice onto said substrate surface, said hot melt adhesive having a viscosity of equal to or less than about 40,000 cps. at 425° F. and
applying a tape to said hot melt adhesive, said tape having a polymeric backing.

10. The method of claim 9 wherein said alkyl substituted hydrocarbon polymer comprises polyisobutylene.

11. The method of claim 9 wherein said diene polymer comprises polyisoprene.

12. The method of claim 9 wherein said alkyl substituted hydrocarbon polymer is present at levels of 90% by weight or greater, and said diene polymer is present at levels of about 10% by weight or less.

13. The method of claim 9 wherein said step of spraying comprises supplying a spraying device including a die wherein said die comprises one or a plurality of openings having a length of about 0.005 to 0.50 inches and a width of about 0.005 to 0.50 inches.

14. The method of claim 9 further comprising preconditioning said substrate wherein preconditioning said substrate surface includes the step of blasting said substrate.

15. The method of claim 9 wherein said substrate comprises a steel pipe.

16. The method of claim 9 wherein said substrate further comprises an outer surface, and a layer disposed on said outer surface wherein said layer is selected from the group consisting of polyethylene, polypropylene, polyurethane and epoxy.

17. The method of claim 9 wherein said polymeric backing comprises a polyethylene selected from the group consisting of low density polyethylene, high density polyethylene and blends thereof.

18. The method of claim 9 wherein said tape includes a pressure sensitive adhesive, wherein said pressure sensitive adhesive contacts said hot melt adhesive.

19. The method of claim 18 wherein said pressure sensitive adhesive comprises a butyl rubber.

* * * * *